Patented Jan. 19, 1926.

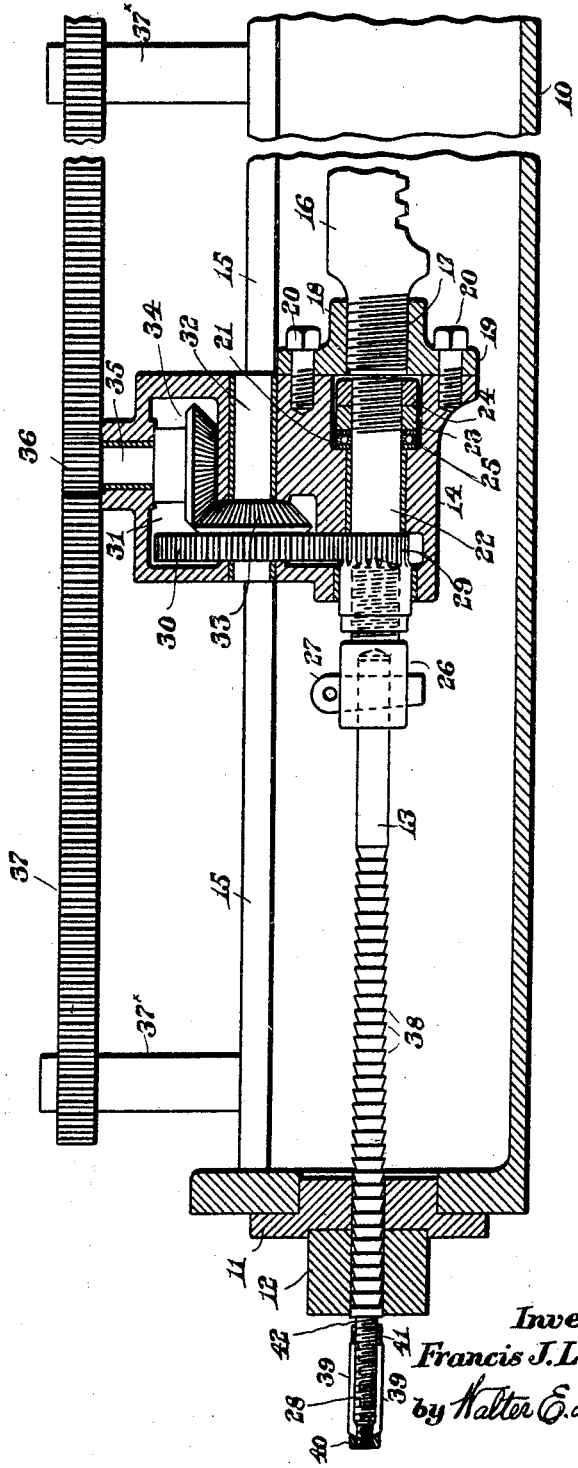

1,569,862

UNITED STATES PATENT OFFICE.

FRANCIS J. LAPOINTE, OF ANN ARBOR, MICHIGAN.

BROACHING MACHINE.

Application filed March 11, 1924. Serial No. 698,548.

*To all whom it may concern:*

Be it known that I, FRANCIS J. LAPOINTE, a citizen of the United States of America, and a resident of Ann Arbor, in the county of Washtenaw and State of Michigan, have invented certain new and useful Improvements in Broaching Machines, of which the following is a specification.

This invention relates to broaching machines and has for its object the provision of means whereby a round broach may be rotated about its axis during the reciprocation thereof.

The invention consists primarily in a reciprocating head having mounted therein a rotatable member to which the broach is secured combined with means for rotating said member.

The invention consists further in certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described except as required by the scope of the appended claims.

The drawing represents a vertical longitudinal section of a broaching machine embodying the principles of the present invention.

In the drawing 10 is a portion of the frame of a broaching machine of any well known construction having at its outer end the usual face plate 11 against which rests the work 12 to be operated upon.

The face plate 11 has an opening therethrough through which the broaching tool 13 is adapted to be reciprocated by means of a carriage 14 movable along guides 15 by an actuating member 16 as is the usual practice.

This actuating member as shown is represented as a rack but other means may be employed if desired.

The actuating member 16 coacts with means for impa:ting reciprocatory movement thereto but as this mechanism forms no part of the present invention it is deemed unnecessary to illustrate the same.

The actuating member 16 is provided with a threaded end 17 screwed into a boss 18 extending from a plate 19 secured by bolts 20 to the carriage 14 and covering a recess 21 therein.

The lower end of the carriage 14 has a revoluble member 22 disposed therein one end of which extends into the recess 21 and has nuts 23, 24 threaded thereto between which nuts 23, 24 and the inner end of the recess 21 is disposed a roller thrust bearing 25 which may be of any well known construction.

The opposite end of the revoluble member 22 has a threaded socket to receive the threaded shank of the broach coupling 26 having a socket therein to receive one end of the broaching tool 13 which is secured therein by means of the wedge-shaped key 27.

The broaching tool 13 is round in the present invention and has mounted on its outer end a reamer 28 which preferably is made in the form to be hereinafter described.

The present invention consists primarily in providing means for rotating the broaching tool 13 during its reciprocation and one means for doing this is illustrated in the drawing.

The revoluble member 22 has peripheral gear teeth 29 preferably formed integral therewith, these teeth meshing with the teeth of a larger gear 30 within a chamber 31 in the upper end of the carriage 14 and fixedly secured to a rotatable shaft 32 having a bevel gear 33 revoluble therewith.

The bevel gear 33 coacts with a bevel gear 34 on the lower end of a short vertical shaft 35 revoluble in a bearing in the upper end of the carriage 14, the upper end of said shaft 35 having a pinion 36 secured thereto and revoluble therewith.

The teeth of the pinion 36 mesh with a rack 37 parallel with the guide 15 and supported upon brackets 37$^x$ extending upwardly from one side of the frame 10.

When the actuating member 16 is moved endwise the carriage 14 will be moved therewith and the coaction of the pinion 36 with rack 37 will cause the member 22 to be revolved through the medium of the gears 34, 33, 30 and 29.

This rotation of the member will impart rotary movement to the broaching tool 13 as it is drawn through the work 12.

When the hole in the work 12 has been cut by the teeth 38 of the broaching tool 13 the reamer 28 will enter the hole in the work 12 and ream the same owing to the rotation thereof during its end movement.

This will cause the hole to be finished perfectly round and free from burrs.

When the broaching tool is pulled through the work without rotation there is a tendency for it to drift off center and an imperfect result is obtained.

This tendency to drift is wholly obviated by imparting rotary movement to the broaching tool while it is being pulled.

This is due to the fact that the side of the broach that has a tendency to drift will revolve and cannot run out of its course very far because its rotary movement will cause it to center itself.

It is obvious that this centering of the tool is due to the fact that owing to the rotary movement imparted to the tool the same side thereof is not in contact with the same section of the work during its entire end movement.

As a consequence the revolving of the tool causes it to center itself much better than if it was pulled straight through the work without being rotated.

This operation insures a perfectly straight hole being formed through the work.

Any number of rotations may be imparted to the tool during its end movement without affecting the principles of the present invention.

The reamer 28 consists of radial grooves formed in the outer end of the tool 13, said grooves having inclined bottom walls as shown in dotted lines.

Blades 39 are disposed in these grooves between collars 40, 41 threaded to the shank 42.

The outer edges of the blades 39 as shown are parallel and extend slightly beyond the cutting edges of the teeth 38.

If the collars 40, 41 are adjusted endwise of the shank 42 the blades 39 will be moved along the inclined bottoms of the grooves and the distance of the cutting edges thereof from the axis of the tool 13 may be varied as desired.

This provision of a reamer of this character is of considerable importance as when a round broach is used and it becomes worn to the slightest degree it becomes unserviceable and must be discarded.

By providing the adjustable blades 39 and adjusting them just sufficiently to scrape the hole the tool is rendered serviceable for a considerably longer period.

Any number of blades may be used and the length thereof may be such as to suit the length of the work being broached, It is obvious that the length of the blades must be governed by the number of revolutions imparted to the tool 13 so that the reamer 28 will revolve a sufficient distance to insure its blades 39 scraping the entire surface of the hole in the work.

The blades 39 are shown as parallel with the axis of the tool 13 but obviously they could be angularly disposed if desired.

It is believed the operation and many advantages of the invention will be apparent without further description.

Having thus described my invention, I claim

1. In a machine of the class described, a reciprocating head; a broach reciprocating therewith having a plurality of annular cutting teeth on its periphery; and means carried by said head for rotating the broach during its reciprocation.

2. In a machine of the class described, a reciprocating head; a member rotatable in a bearing therein; a broach secured to and rotatable with said member, said broach having on its periphery a plurality of parallel cutting teeth annularly disposed thereon; and means for rotating said member during the reciprocation of said head.

3. In a machine of the class described; a reciprocating head; a rotatable member therein provided with peripheral gear teeth; a broach secured to and rotatable with said member, said broach having parallel peripheral teeth annularly disposed thereon; and gearing carried by said head and meshing with said teeth for rotating said member during the reciprocation of said head.

4. In a machine of the class described; a reciprocating head; a rotatable member therein and reciprocable therewith; a broach secured to and rotatable with said member having annular teeth on its periphery; a fixed bar parallel with the path of said head; and mechanism carried by said head interposed between said rotatable member and bar adapted to rotate the former by coaction of an element of said mechanism with said bar.

5. In a machine of the class described; a reciprocating head; a rotatable member therein and adapted to reciprocate therewith provided with peripheral gear teeth; a broach having cutting teeth annularly disposed on its periphery; means for securing said broach to said member; a fixed rack; a pinion meshing therewith; and means carried by said head interposed between said pinion and teeth for imparting rotary movement to said member during the rotation of said pinion.

6. In a machine of the class described; a reciprocating head; a rotatable member therein and adapted to reciprocate therewith provided with peripheral gear teeth; a gear meshing with said teeth; a bevel gear rotatable with said gear; a fixed rack; a pinion meshing therewith; a bevel gear rotatable with said pinion and meshing with the first mentioned bevel gear; a broach having cutting teeth annularly disposed on its periphery; and means for securing said broach to said rotatable member.

7. In a machine of the class described, a reciprocating head having a depression in one end; a rotatable member in said head with one end in said depression provided with nuts threaded thereto; a thrust bearing between said nuts and the inner end of said depression; means for attaching a broach to the opposite end of said rotatable member; and means carried by said head for imparting rotary movement to said member during the reciprocating of said head.

8. In a machine of the class described, a reciprocating head having a depression in one end; a rotatable member in said head with one end provided with nuts threaded thereto within said depression; a thrust bearing between said nuts and the inner end of said depression; means for attaching a broach to the opposite ends of said rotatable member; means for imparting rotary movement to said member; a plate secured to said head and provided with a threaded boss; and a draw member having its end threaded into said boss.

9. In a machine of the class described, a frame having parallel guides and at one end a work supporting face plate; a head adapted to reciprocate on said guides; a member by which reciprocatory movement may be imparted to said head; a broach extending through said face plate and provided with a plurality of annular cutting teeth on its periphery; a member rotatably mounted in a bearing in said head and having gear teeth formed thereon; means for securing said broach to said rotatable member; a rack fixed on said frame; and a train of gears within said head for revolving said rotatable member including a gear meshing with said rack.

10. In a machine of the class described, a frame having parallel guides and at one end a work supporting face plate; a head adapted to reciprocate on said guides; a member by which reciprocatory movement may be imparted to said head; a broach extending through said face plate and provided with a plurality of annular cutting teeth on its periphery; a member rotatably mounted in a bearing in said head and having gear teeth formed thereon; and means for securing said broach to said rotatable member; and means for imparting rotary movement to said rotatable member during the reciprocation of said head.

11. In a machine of the class described, a frame having parallel guides and at one end a work supporting face plate; a head adapted to reciprocate on said guides; a member rotatably mounted in said head; means for rotating said member carried by said head and including a driving gear; a fixed rack parallel with said frame, the teeth of which mesh with the teeth of said gear; and a broach secured to and reciprocating with said head, said broach extending through the face plate and being provided with a plurality of annular teeth on the periphery thereof.

12. In a machine of the class described, a frame having parallel guides and at one end a work supporting face plate; a head adapted to reciprocate on said guides; a member rotatably mounted in said head; means for rotating said member carried by said head and including a driving gear; a fixed rack parallel with said frame, the teeth of which mesh with the teeth of said gear; and a broach secured to and reciprocating with said head, said broach extending through the face plate and being provided with a plurality of annular teeth of gradually increasing diameter on the periphery thereof.

Signed by me at Ann Arbor, Michigan this 7th day of March 1924.

FRANCIS J. LAPOINTE.